UNITED STATES PATENT OFFICE.

DELIAN H. BISAILLON, OF LOCKPORT, NEW YORK.

OINTMENT.

SPECIFICATION forming part of Letters Patent No. 320,836, dated June 23, 1885.

Application filed April 8, 1885. (No specimens.)

*To all whom it may concern:*

Be it known that I, DELIAN H. BISAILLON, a citizen of the United States of America, residing at Lockport, in the county of Niagara and State of New York, have invented certain new and useful Improvements in Ointments, of which the following is a specification.

My medicine is designed for the treatment of piles or hemorrhoids, substantially as hereinafter fully set forth, and pointed out in the claim.

In the preparation of my medicine I take two hundred and forty grains of red precipitate, eighty grains of blue vitriol, one hundred and sixty grains of powdered opium, one hundred and sixty grains of zinc oxide, and two hundred and forty grains of powdered nutgalls. These ingredients I thoroughly compound into a homogeneous mass, and then take the above amount, when combined, and six ounces of mullein, five ounces of elder-bark, three pounds of mutton-tallow, and one pound of lard, and thoroughly mix the two compounds together in about the proportions specified, more or less.

In the composition of my medicine I take a sufficient quantity of elder branches, and remove therefrom the outer or cortical portion of the bark, and I then take a sufficient quantity of mullein-leaves and place a layer of mutton-tallow between the alternate layers of mullein-leaves and elder-bark, and stew the same together without the use of water. These last-named ingredients I then combine with the aforementioned component parts in the proportions specified.

This medicine is found a sure relief for piles or hemorrhoids of all classes and natures, and proves effectual in the most severe cases, often where other remedies have failed.

Having thus fully described my invention, what I claim, and desire to secure by Letters Patent, is—

A medicine for the treatment of piles, composed of about two hundred and forty grains of red precipitate, about eighty grains of blue vitriol, about one hundred and sixty grains of powdered opium, about one hundred and sixty grains of zinc oxide, about two hundred and forty grains of powdered nutgalls, thoroughly intermingled with about six ounces of mullein, about five ounces of elder-bark, about three pounds of mutton-tallow, and about one pound of lard.

In testimony whereof I affix my signature in presence of two witnesses.

DELIAN H. BISAILLON.

Witnesses:
WM. E. JENNEY, Jr.,
F. B. DAGGETT.